(12) United States Patent
Oppermann

(10) Patent No.: US 7,114,420 B1
(45) Date of Patent: Oct. 3, 2006

(54) VIBRATION ATTENUATOR CLIP AND ATTENUATOR USING THE SAME

(75) Inventor: Harald Oppermann, Burgwedel/Wettmar (DE)

(73) Assignee: Pro-Cut International, LLC, West Lebanon, NH (US)

( * ) Notice: Subject to any disclaimer, the term of this patent is extended or adjusted under 35 U.S.C. 154(b) by 72 days.

(21) Appl. No.: 11/159,067

(22) Filed: Jun. 22, 2005

(51) Int. Cl.
*B23B 3/06* (2006.01)

(52) U.S. Cl. .............................. 82/163; 82/904; 82/112; 74/572.21

(58) Field of Classification Search ............. 74/572.21, 74/574.3; 82/163, 112, 903, 904, 152
See application file for complete search history.

(56) References Cited

U.S. PATENT DOCUMENTS

| | | | |
|---|---|---|---|
| 3,710,661 A | 1/1973 | Mitchell | |
| 4,178,819 A * | 12/1979 | Mahon | 82/163 |
| 4,266,454 A * | 5/1981 | Mitchell et al. | 82/1.11 |
| 4,531,434 A | 7/1985 | Vasquez | |
| 4,641,732 A * | 2/1987 | Andry | 188/379 |
| 5,297,460 A * | 3/1994 | Hartman et al. | 82/163 |
| 5,862,669 A * | 1/1999 | Davis et al. | 62/3.64 |
| 6,227,085 B1 * | 5/2001 | Vasquez, Jr. | 82/163 |
| 6,553,877 B1 * | 4/2003 | Vasquez, Jr. | 82/163 |
| 6,591,720 B1 * | 7/2003 | Greenwald et al. | 82/112 |
| 6,865,972 B1 * | 3/2005 | Sipe | 82/112 |

* cited by examiner

*Primary Examiner*—Willmon Fridie, Jr.
(74) *Attorney, Agent, or Firm*—Michael J. Weins

(57) ABSTRACT

A clip engages a pair of legs of a vibration attenuator to reduce the local separation of the legs, thereby increasing the force of friction pads, affixed to the legs, against a brake disk to compensate for reduced thickness of the friction pads due to wear. The clip has a first end region, which can preferably be snappably engaged with one of the legs so as to pivot thereabout. The clip has a second end region with a protrusion which can be engaged with the other leg so as to restrain it at the reduced separation. Preferably, a second protrusion is provided to allow restraining the other leg at an even smaller local separation from the leg that is rotatably engaged by the first end region. A tab preferably extends beyond the first protrusion to aid in engaging and disengaging the second end region from the other leg.

13 Claims, 4 Drawing Sheets

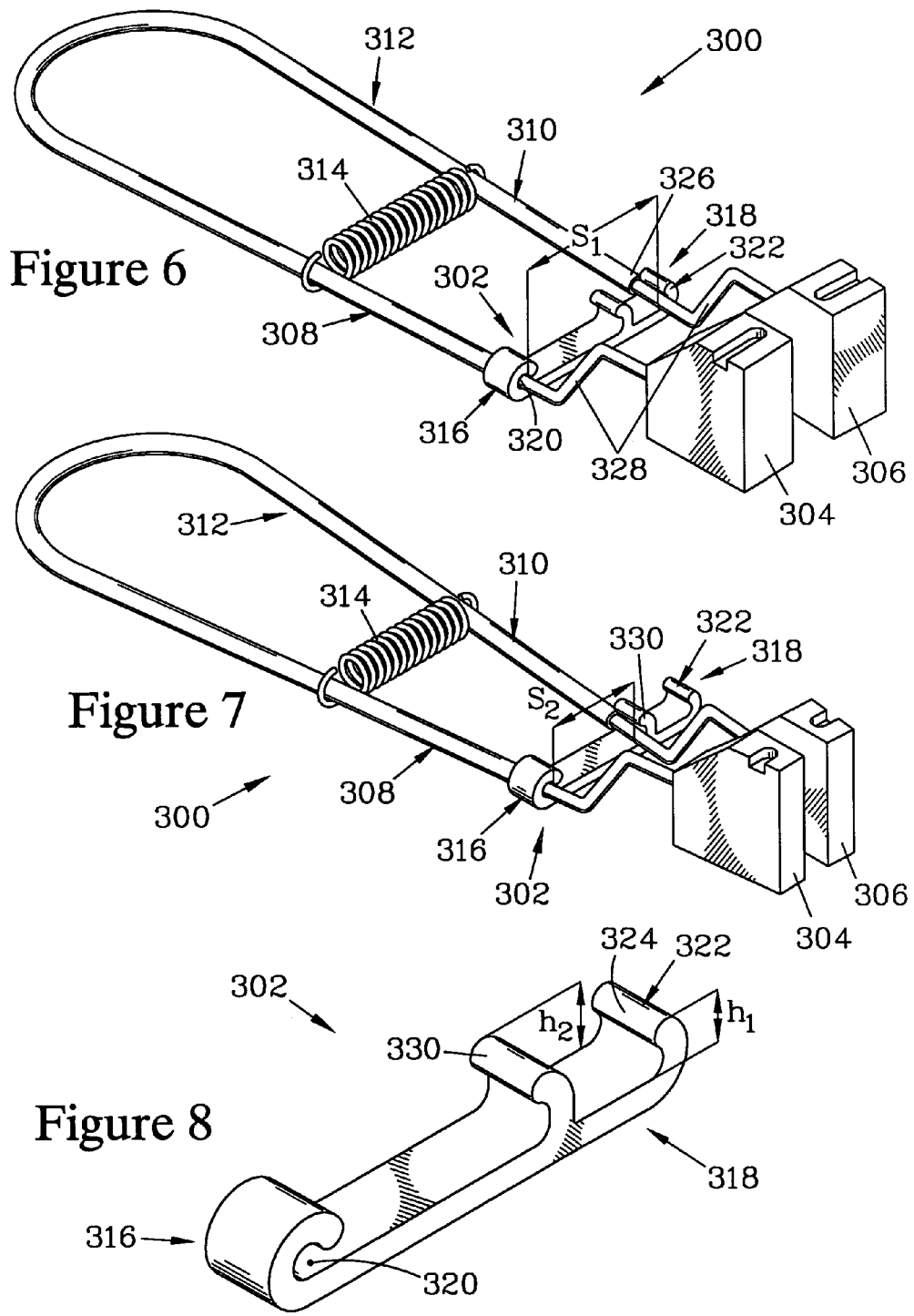

VIBRATION ATTENUATOR CLIP AND ATTENUATOR USING THE SAME

FIELD OF INVENTION

The present invention is for a vibration attenuator for use with a disk brake lathe to reduce noise and vibrations resulting from machining the surfaces of a brake disk by the lathe. More particularly, it relates to a clip for a vibration attenuator that allows the attenuator pressure applied to the brake disk to be adjusted to compensate for wear of the attenuator and, in some situations, the condition of the disk brake surface.

BACKGROUND OF THE INVENTION

Automotive brake disks are periodically resurfaced by a disk brake lathe in order to maintain proper operation of the brakes in service. The disk brake lathe typically has a pair of cutting tools, each attached to a tool holder by a fastener to allow replacement when the cutting tool becomes worn. The tool holders position the cutting tools against the surfaces of the brake disk to establish a desired depth of cut, and then maintain the cutting tools in position as they are drawn across the disk surfaces while the lathe rotates the brake disk in order to machine the disk surfaces. Typically, the desired depth of cut is set and the cutting tools are positioned near the center of the brake disk to begin the machining process. The cutting tools are then moved radially outwards to resurface the brake disk.

Vibrations caused by the cutting action of the cutting tools on the disk surfaces need to be attenuated, both to reduce chattering of the cutting tools to assure that the resulting machined disk surfaces are sufficiently planar for proper operation, and to reduce undesirable noise in the machining environment. One approach to reducing vibrations has been the use of friction pads which are biased against the disk surfaces by a spring. The friction pads engage the cutting tools, the tool holders, and/or the fasteners so as to move with the cutting tools across the disk surfaces. Such devices are taught in U.S. Pat. Nos. 3,710,661; 4,531,434; 5,297,460; 6,227,085; 6,553,877; and 6,591,720.

One limitation of this technique is that the pads wear as they rotate against the disk surfaces, and thus their effectiveness in attenuating vibrations diminishes as a function of time, since the spring force will diminish as the pads wear. This problem compounds as the thickness of the friction pads increases, since employing a spring which provides sufficient pressure at or near the time when the pads are to be discarded will apply excessive pressure when the friction pads are new, accelerating wear of the friction pads. Similarly, if the spring force is adjusted so as to apply a practical amount of pressure when the pads are new, the pressure applied by the spring may be inadequate when the pad has experienced substantial wear but is not yet worn to the point were it needs to be discarded. Thus, there is a need for a vibration attenuator where the force can be varied to better suite the situation and to compensate for wear of the pads.

SUMMARY OF THE INVENTION

The present invention relates to a clip designed to be used with a vibration attenuator for a brake disk lathe used to periodically resurface a pair of disk surfaces of a brake disk. The clip is designed to be used with a vibration attenuator designed for use with a brake disk lathe having a pair of cutting tools, each of which is mounted to an associated tool holder. The tool holders in turn allow the tool mounted thereon to be adjusted with respect to the disk surfaces to set a desired depth of cut. The tool holders are supported on a cutting head assembly which is movable so as to move the tool holders in a direction which is substantially radial with respect to the disk.

A suitable vibration attenuator for which the clip of the present invention is designed has a pair of friction pads, each of which has a disk-engaging surface designed to be forcibly engaged with the disk surfaces of the brake disk, and means for frictionally engaging the disk-engaging surfaces with the brake disk. The clip is configured such that it can be engaged with the vibration attenuator in a manner designed to compensate for the wear of the friction pads.

The clip provides means for applying an incremental force on the friction pads to increase the force the of the pads against the disk surfaces. By adjusting the clip, a user can incrementally increase the pressure of the friction pads against the disk surfaces, thereby compensating for reduction in the force on the pads provided by the means for frictionally engaging the disk engaging surfaces, such reduction being due to wear of the pads.

The clip for providing an incremental force on the fictional pads has been found to be particularly effective for silencers where the means for frictionally engaging the disk-engaging surfaces of the friction pads with the disk surfaces is provided by a U-shaped member fabricated from a resilient material which is bent into a horseshoe shape and terminates in a pair of legs having free ends on which the friction pads are mounted. Preferably, a tension spring is provided between the legs to draw the legs together and enhance the force applied by the pads to the disk surfaces.

While the above described means are frequently used, it should be appreciated that the clip has utility for attenuators that use other means for frictionally engaging the disk-engaging surfaces with legs biased toward each other, such as those taught in U.S. Pat. Nos. 3,710,661 and 5,297,460.

The clip of the present invention terminates in a first end region and a second end region that is spaced apart from the first end region. The first end region is configured to pivotally engage one of the pair of legs of the vibration attenuator, hereafter referred to as a first leg and the other of the legs being referred to as a second leg. It is preferred for the configuration of the first end region to be such as to create a passage that surrounds a sufficient portion of the first leg that the clip remains rotatably engaged with the first leg unless it is forcibly disengaged.

The second end region is provide with at least a first protrusion configured such that, as the clip is pivoted about the first leg so as to advance the first protrusion toward the second leg, the first protrusion can be slidably engaged with the second leg. The first protrusion is preferably further configured such that, when so engaged with the second leg, the first protrusion forms a cradle for retaining the second leg. The first protrusion positioned such that a local separation $S_1$ is maintained between the legs when the first leg is pivotally engaged in the first end region of the clip and the second leg is positioned such that it is cradled by the first protrusion. The separation $S_1$ is chosen such that, when the second leg is so engaged, a bending moment on the legs is created by the engagement, this bending moment being greater than the force that would be provided by the spring, thereby providing an incremental increase in the force on the pads.

When additional adjustability is sought, the first end region and the second end region can be configured such that the clip slidably engages the first leg and the second leg, so as to allow the longitudinal position of the clip along the pair of legs to be changed. Such movement of the clip will in turn change the bending moment and the corresponding force applied by the friction pads to the disk surfaces.

When additional incremental changes in the force are desired, such can be provided by incorporating a second protrusion which is configured and poisoned such that, when the first leg is pivotally engaged in the first end region of the clip and the second leg is positioned such that it is cradled by the second protrusion, the legs will be spaced apart at a second separation $S_2$ where they are engaged by the clip, and where $S_1 > S_2$.

To increase the moment that can be provided for engaging and disengaging the protrusions, it is preferred to provide a tab extending from the second end region to increase the leverage that the user can readily apply when rotating the protrusions onto and off of the second leg.

While having the clip able to slide up and down the legs may provide additional adjustability of the pressure applied to the disk by the friction pads, the clip may slide longitudinally on the legs during service to relax the force if the frictional forces between the legs and the clip are not sufficient. To minimize such, the frictional force between the clip and the legs can be increased by coating the U-shaped member with a polymer or elastomer, which will not only increase the friction therebetween, but will also make the U-shaped member more comfortable to grip.

Alternatively, if the force of friction is not sufficient to maintain the clip in place during certain aggressive cutting conditions, then the clip can be engaged with regions of the legs that are bounded by thickened leg segments on one side or both sides of the clip so as to positively prevent longitudinal movement of the clip along the legs.

BRIEF DESCRIPTION OF THE FIGURES

FIG. 6 is an isometric view of a vibration attenuator which is being used with a clip that forms another embodiment of the present invention. The clip has a passage for pivotally engaging the first leg and two protrusions which can be selectively engaged with the second leg. The protrusions are spaced along the clip so as to provide a stepwise increase in the force the pads apply to the disk surfaces.

FIG. 7 is an isometric view of the vibration attenuator shown in FIG. 6, but where the friction pads have been in service for a considerable time and are worn to the point where their thickness has been substantially reduced. Engaging the second leg with the second protrusion on the clip increases the pressure of the pads to compensate for their reduced thickness.

FIG. 8 is an enlarged isometric view better illustrating the clip of the embodiment shown in FIGS. 6 and 7.

DETAILED DESCRIPTION OF THE PREFERRED EMBODIMENTS

Figure 1:
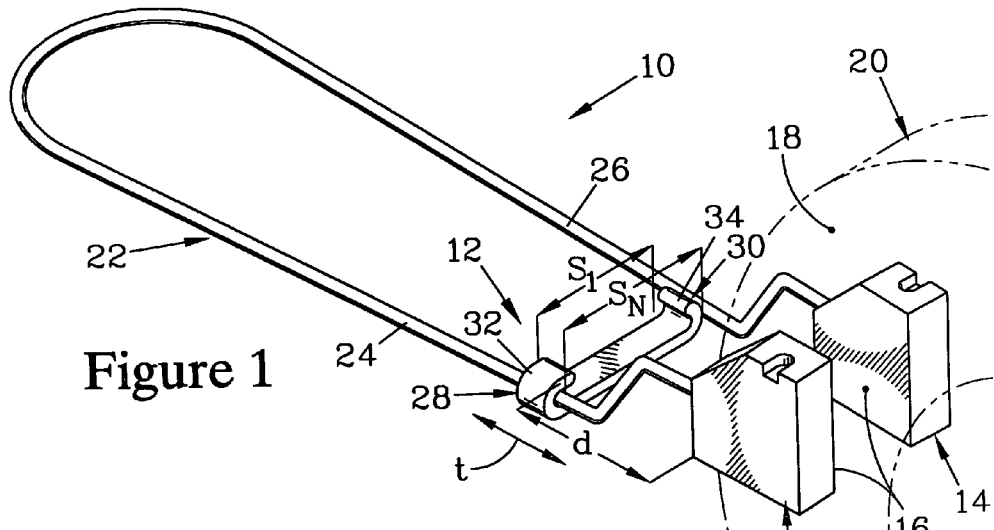
FIG. 1 is an isometric view of a vibration attenuator and a clip which forms one embodiment of the present invention. The attenuator has a pair of friction pads attached to a spring steel wire which has been formed into a horseshoe with legs that support the pads. The legs also provide a force on the friction pads if their separation is increased by placing a brake disk therebetween that is thicker than their natural separation. The clip can be engaged with the legs so as to decrease the separation between the two legs, thereby varying the bending moments on the resilient legs so as to provide an incremental force increase when the clip is engaged with both legs.
Figure 2:
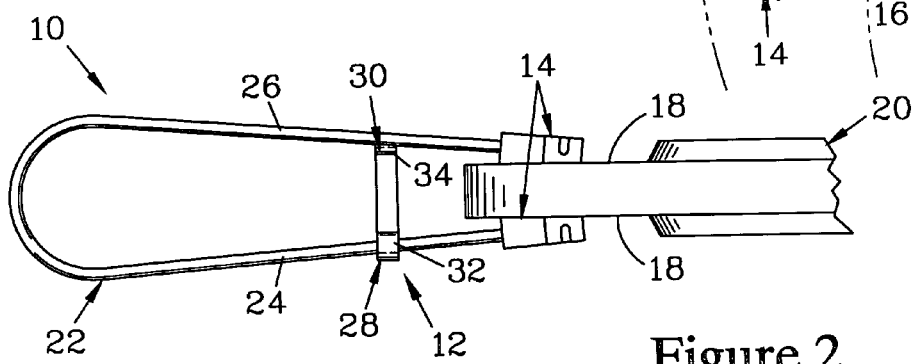
FIGS. 2 and 3 are plan views illustrating the vibration attenuator and clip shown in FIG. 1 when the clip is only engaged with one of the legs of the attenuator, in FIG. 2, and when engaged with both legs, in FIG. 3. When engaged with both legs, the clip locally draws the legs together, adding an additional bending moment of the legs and increasing the force of the friction pads against the brake disk.
Figure 3:
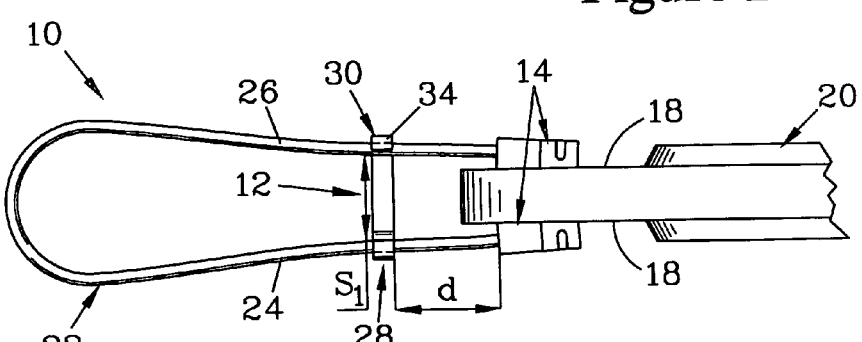

FIGS. 1 through 3 are views of a vibration attenuator 10 that is suitable for use with a clip 12 which forms one embodiment of the present invention and which, when used in combination with the attenuator, provides an improved attenuator system. These figures show the vibration attenuator 10 in an inverted position to better show the structure; this convention is also followed in the figures illustrating the other embodiments discussed below (a figure showing such a vibration attenuator in the service position on a brake lathe is found in U.S. Pat. No. 6,591,720). FIG. 1 is an isometric view of the vibration attenuator 10 and the clip 12, while FIGS. 2 and 3 are plan views showing the vibration attenuator 10 when in service. The vibration attenuator 10 has a pair of friction pads 14 which each have a disk-engaging surface 16. When the vibration attenuator 10 is in service, the disk-engaging surfaces 16 engage caliper-engaging surfaces 18 of a brake disk 20, as shown in FIGS. 2 and 3. The friction pads 14 are attached to a steel spring wire which has been bent to form a horseshoe-shaped wire member 22. The horseshoe-shaped wire member 22 has a first leg 24 and a second leg 26 that are positioned such that, when attached to the pair of friction pads 14 that in turn are slidably engaged with the brake disk 20, the horseshoe-shaped member 22 provides a frictional force between the disk-engaging surfaces 16 of the friction pads 14 and the caliper-engaging surfaces 18 of the disk bake 20. As the friction pads 14 wear, the pressure exerted by the legs (24, 26) decreases and, in due course, the pressure on the friction pads 14 is insufficient for the friction pads 14 to attenuate vibrations that result from the machining of the caliper-engaging surfaces 18.

The clip 12 of the present invention is provided to compensate for wear of the friction pads 14 and thus increase the service life of the vibration attenuator 10. The clip 12 terminates in a first end region 28 and a second end region 30. The first end region 28 is configured to pivotally engage the first leg 24 of the horseshoe-shaped wire member 22. In this embodiment, the first end region 28 forms a hook 32 which is configured to pivotally engage the first leg 24 of the horseshoe wire 22. A first protrusion 34 is provided on the second end region 30. The first protrusion 34 is configured such that, when the clip 12 is pivoted about the first leg 24 so as to advance the first protrusion 34 toward the second leg 26, the first protrusion 34 can be engaged with the second leg 26 to form a cradle for retaining the second leg 26 when so engaged. The first protrusion 34 is positioned in a spaced-apart relationship to the hook 32 such that a local separation $S_1$ is maintained between the first leg 24 and the second leg 26 when the first leg 24 is pivotally engaged with the hook 32 and the second leg 26 is cradled by the first protrusion 34. The first protrusion 34 is configured such that the cradle formed for the second leg 26 acts to restrain the release of the second leg 26.

As shown in FIG. 1, the separation $S_1$ is selected such that it is less than the natural separation $S_N$ of the legs (24, 26), measured at the same displacement d from the friction pads 14 when the friction pads 14 are unworn and are held in contact with the caliper-engaging surfaces 18 by the legs (24, 26). When the clip 12 is engaged with both legs (24, 26), as illustrated in FIG. 3, the legs (24, 26) are bowed toward each other by the clip 12 and, in so doing, bending moments are generated in the legs (24, 26) which further load the friction pads 14. The moment and the resulting force can be adjusted by adjusting the position of the clip 12 along the legs (24, 26), as indicated by the arrow t shown in FIG. 1.

Figure 4:
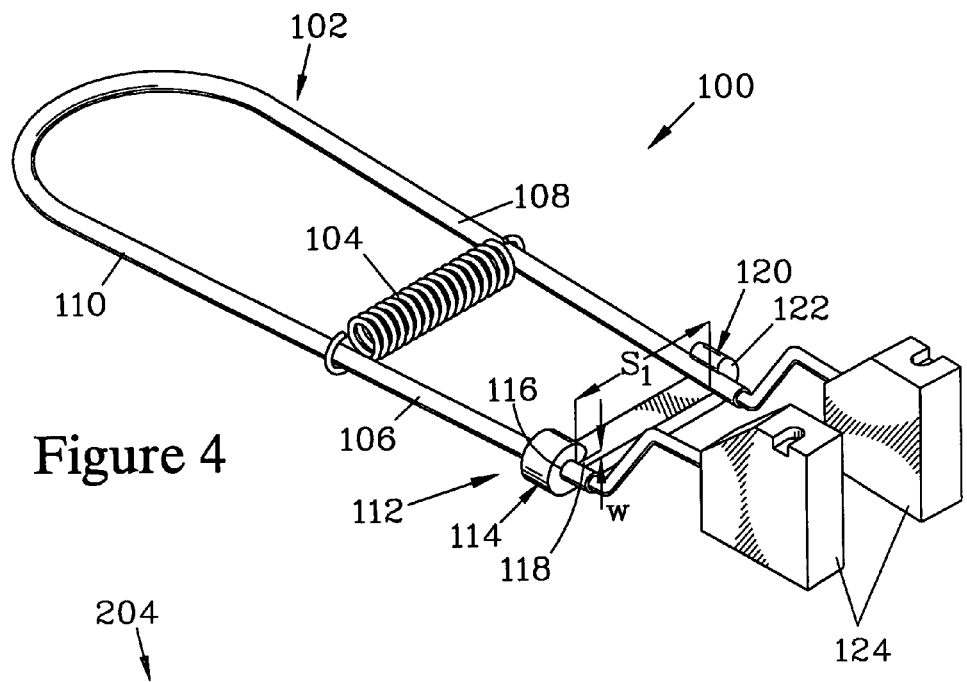
FIG. 4 is an isometric view another vibration attenuator which is similar to that shown in FIGS. 1–3. In this embodiment, the U-shaped member of the attenuator has been coated with an elastomeric material to increase the friction between the clip and the legs of the U-shaped member to prevent longitudinal slippage of the clip along the legs when in service. This embodiment also includes a tension spring that serves to increase the force which the disk-engaging surfaces apply against the brake disk.

FIG. 4 is an isometric view of another vibration attenuator 100, which shares many of the features of the attenuator 10 illustrated in FIGS. 1 through 3. The attenuator 100 differs, in part, in that it employs a U-shaped wire 102 which is drawn into a horseshoe-shape by a tension spring 104 which is attached between a first leg 106 and a second leg 108. A large portion of the U-shaped wire 102 is coated with a polymer to form a handle 110 which can be comfortably gripped with a squeezing action. The polymer coating also serves to help maintain the tension spring 104 in a fixed position along the legs (106, 108).

Again, a clip 112 is provided which, by itself or in combination with an attenuator such as the attenuator 100, forms another embodiment of the present invention. The clip 112 terminates in a first end region 114 which is configured to pivotally engage the first leg 106. The pivotal engagement in this embodiment is provided by a first end region passage 116. The first end region passage 116 is an open-sided passage that sufficiently surrounds the first leg 106 such that, once the first leg 106 is engaged with the first end region passage 116, the first leg 106 remains so engaged unless forcibly removed. In this embodiment, the first end region passage 116 is configured with an opening 118 having a width w sufficient that the clip 112 can be snapped on and off the coated section of the first leg 106 and, when snapped thereon, can rotate thereabout. Having the clip 112 so mounted provides multiple benefits. First, it keeps the clip 112 with the remainder of the vibration attenuator 100 so that it will always be available when needed. Having the clip 112 snap on, rather than being permanently attached, simplifies assembly when an attenuator system incorporating the clip 112 is to be provided and allows the clip 112 to be readily removed in the event that the user does not have sufficient experience to use it effectively.

The clip 112 also terminates in a second end region 120, which is provided with a first protrusion 122. The first protrusion 122 is configured such that it can be slidably engaged across the second leg 108 of the U-shaped wire 102 while the legs (106, 108) are squeezed together by the user. When the second protrusion is engaged with the second leg 108, it acts to restrainably engage the second leg 108. The first protrusion 120 is separated from the first end region passage 116 such that, when engaged with the second leg 108, the legs (106, 108) are locally spaced apart by a separation $S_1$. Again, the separation $S_1$ is selected, as discussed above, as a value less than $S_N$, where $S_N$ (as shown in FIG. 1) is the natural separation of the legs (106, 108) which is determined when friction pads 124 attached to the legs (106, 108) are unworn and are held in contact with a disk brake (not shown) by the legs (106, 108) under the bias of the tension spring 104. By so restricting the separation of the legs (106, 108) as discussed above, there will be a moment applied to the legs (106, 108) which increases the force that the friction pads 124 apply to the disk brake which is being machined.

While the clip 112 can be translated along the coated sections of the legs (106, 108), the polymer coating should impede such motion and thus reduce the chance of inadvertent readjustment in service due to the vibrations resulting from machining.

Figure 5:
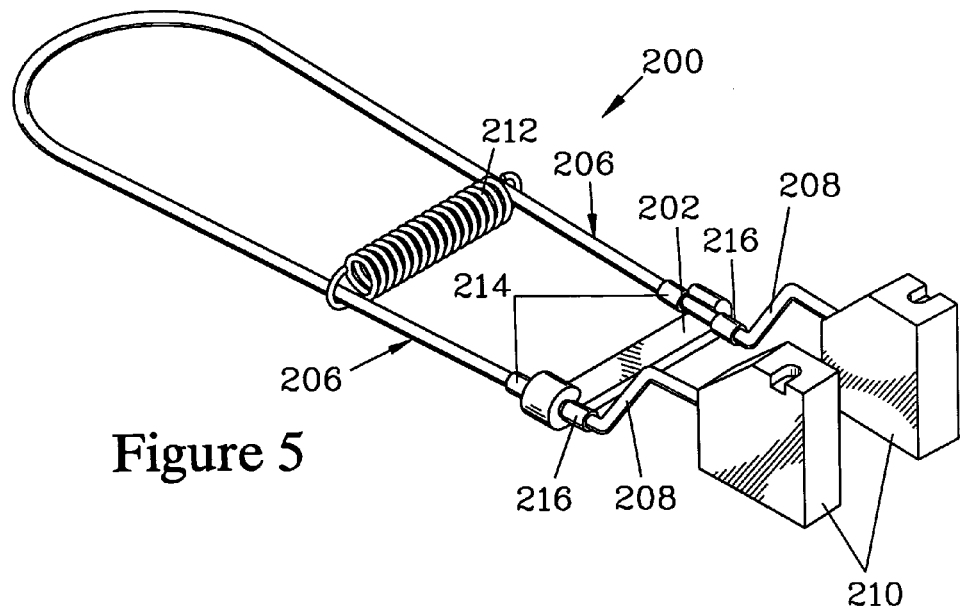
FIG. 5 is an isometric view of a vibration attenuator and a clip which is similar to that shown in FIG. 4. In this embodiment, longitudinal slippage of the clip is prevented by restraining bands mounted on the legs and bracketing the clip where it engages the legs.

FIG. 5 is a isometric view of another attenuator 200 with a clip 202 which forms another embodiment of the present invention. The vibration attenuator 200 shares many of the features of the attenuator 100 shown in FIG. 4. The vibration attenuator 200 has a generally U-shaped handle 204 which has a pair of legs 206 which each terminate in a stepped section 208, to which is attached a friction pad 210. A tension spring 212 is attached between the legs 206 so as to pull the friction pads 210 toward each other. The attenuator 200 differs in that it has a first pair of restraining rings 214 mounted on the two legs 206 to block motion of the clip 202 along the legs 206 toward the tension spring 212. Optionally, a pair of second restraining rings 216 can be provided to limit the motion of the clip 202 toward the pads 210, in which case the pairs of restraining rings (214, 216) bracket the regions of the legs 206 where the clip 202 attaches.

FIGS. 6 and 7 are isometric views of a vibration attenuator 300 and a clip 302 which forms another embodiment of the present invention. The clip 302, which is better shown in FIG. 8, differs from the clips discussed above in that the clip 302 is configured to allow a user to apply incremental forces based on the condition of the vibration attenuator 300. A first incremental force can be applied when the wear on the vibration attenuator 300 is moderate, and a second incremental force can be applied after the benefits of the first incremental force have been diminished by subsequent wear. FIG. 6 shows the attenuator 300 when moderate wear has occurred, while FIG. 7 shows the attenuator 300 when a first friction pad 304 and a second friction pad 306 have been worn to significantly reduced thicknesses.

In this embodiment, the friction pads (304, 306) initially have a greater thickness than the friction pads of the earlier described embodiments so that they will provide a longer service life. The friction pad 304 is attached to a first leg 308 while the second friction pad 306 attaches a second leg 310. The legs (308, 310) in turn are part of a handle 312 which is formed from a U-shaped spring steel wire. The handle 312 is maintained in a horseshoe shape by a tension spring 314.

The clip 302 has a first end region 316 and a second end region 318. The first end region 316 has a first end region passage 320 therethrough, configured to rotatably engage the first leg 308 of the handle 312. Here again, the first end region passage 320 is configured such that it can be snapped onto and off of the first leg 308. As discussed above, this allows the clip 302 to be readily removed in the event that an operator does not have sufficient experience to have developed an appreciation of when an incremental increase would be helpful and would not result in excessive wear of the friction pads (304, 306).

The second end region 318 of the clip 302 is provided with a first protrusion 322 which is spaced apart from the first end region passage 320. The first protrusion 322 is configured such that, as the clip 302 is swung into contact with the second leg 310, typically while the user squeezes the legs (308, 310) together slightly, the first protrusion 322 has a raise surface 324 (shown in FIG. 8) which can ride up and over the second leg 310. As the clip 302 continues to be rotated toward the second leg 310, the first protrusion 322 snappably engages the second leg 310 and, when so engaged, the first protrusion 322 cradles the second leg 310. Once the first protrusion 322 is so engaged, the contouring of the first protrusion 322 so as to form a cradle helps retain the clip 302 in contact with the second leg 310. The first protrusion 322 is positioned with respect to the first end region passage 320 such as to maintain the legs (308, 310) at a local separation $S_1$ (shown in FIG. 6) when the first protrusion 322 is engaged with the second leg 310. This separation $S_1$ is less than the natural separation which would be maintained if the friction pads (304, 306) were unworn and were being held against a disk by the attenuator 300 without the clip 302.

The vibration attenuator 300 has a region of the handle 312 residing behind the clip 302 coated with a polymer layer 326 which makes the handle 312 more comfortable to grip, as well as providing a stop which prevent the clip 302 from moving back along the legs (308, 310). Steps 328 are formed in the legs (308, 310), such as are typically employed to facilitate placing an attenuator over the tool holders of a lathe. These steps 328 also limit movement of the clip 302 towards the friction pads (304, 306). Having the motion so restricted helps assure that, whenever the clip 302 is engaged with the legs (308, 310), it engages them at the same locations on the legs (308, 310) and thus provides predictable moments on the legs (308, 310) which continuously diminish as the wear on the friction pads increases.

The clip 302 of this embodiment has a second protrusion 330, which is configured to snappably engage the second leg 310 as the friction pads (304, 306) are subject to further wear such that the first protrusion 322 no longer provides sufficient moment of the legs (308, 310) to maintain the pressure on the friction pads (304, 306) sufficient to maintain the effectiveness of the vibration attenuator 300. The second protrusion 330 is spaced apart from the first end region passage 320 such that, when engaged with the second leg 310 (as shown in FIG. 7), the legs (308, 310) are locally spaced apart by a separation $S_2$, where $S_2<S_1$. This reduced separation results in an incremental increase in force being applied to the friction pads (304, 306) when the second protrusion 330, rather than the first protrusion 322, is engaged with the second leg 310. It is further preferred that the second protrusion 330 have a height $h_2$ greater than a height $h_1$ of the first protrusion 322, as shown in FIG. 8. This differential height provides an index to avoid overshooting the first protrusion 322 when providing an incremental force. It is also preferred that each of the protrusions (322, 330) be so configured such that they more securely retain the second leg 310 as the separation is lessened. This can be provided by having the second protrusion 330 more curled than the first protrusion 322.

Figure 9:
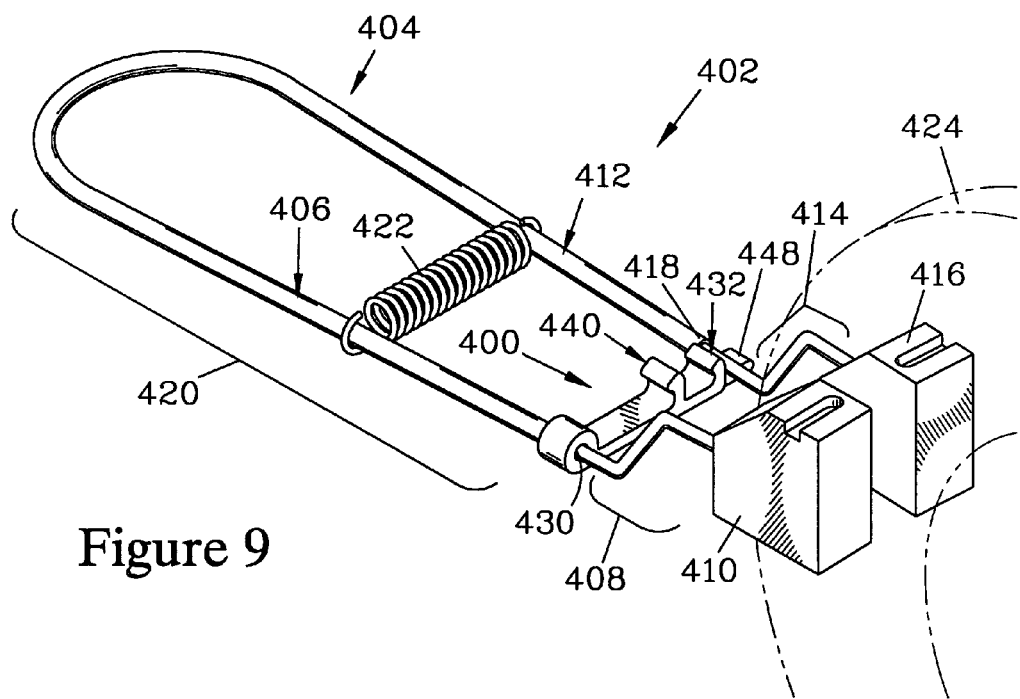
FIG. 9 is an isometric view of an embodiment which is similar to the embodiment shown in FIGS. 6 and 7, but differing in that the clip is provided with a tab extending beyond the protrusions. The tab allows a user to more readily engage one of the protrusions with the second leg or disengage it therefrom.

FIG. 9 illustrates a clip 400 which forms another embodiment of the present invention which is designed to be used with a vibration attenuator 402. The vibration attenuator 402 shares many of the features of the vibration attenuator 300 illustrated in FIGS. 6 and 7. The vibration attenuator 402 has a generally U-shaped handle 404 which in turn has a first leg 406, terminating in a first leg terminating section 408 which is stepped and has a first friction pad 410 attached thereto. Similarly, the U-shaped handle 404 has a second leg 412, terminating in a second leg termination section 414, which is stepped and has a second friction pad 416 attached thereto. The U-shaped handle 404 has a polymer overcoat 418 applied to a rear portion 420 thereof. A tension spring 422 is attached between the legs (406, 412) and serves to draw the friction pads (410, 416) into contact with a brake disk 424 (a portion is shown in phantom). As illustrated in FIG. 9, the friction pads (410, 416) are new and spring tension forcibly engages the friction pads (410, 416) with the disk 420. Under such circumstances, there is no need for applying an incremental force to keep the friction pads (410, 416) effectively pressed against the brake disk 424.

The vibration alternator 402 is provided with the clip 400 which can be utilized as the friction pads (410, 416) become worn, but which is not needed when the friction pads (410, 416) are new and thus, as illustrated in FIG. 9 does not provide a restraining force, since it does not actively engage the second leg 412 but only rests thereon when the vibration attenuator 402 is in service.

Figure 10:
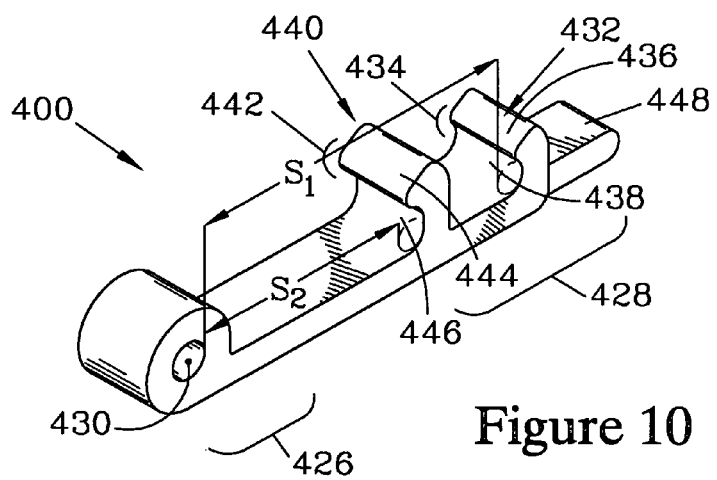
FIG. 10 is an enlarged isometric view of the clip of the embodiment shown in FIG. 9.

FIG. 10 better illustrates the details of the clip 400, which is similar to the clip 302 illustrated in FIGS. 6–8. The clip 400 terminates in a first end region 426 and a second end region 428. In this embodiment, the first end region 426 is provided with a first end region passage 430 which completely surrounds a cross section of the first leg 406. While such a complete passage can be employed, it complicates fabrication of such a vibration attenuator system, since the clip 400 needs to be placed on the first leg 406 during the process of fabricating the vibration attenuator 402. In fact, the clip 400 would need to be engaged with the first leg 406 before the first leg 406 is bent to provide the stepped first leg terminating section 408.

The second end region 428 of the clip 400 has a first protrusion 432 which is spaced apart from the first end region passage 430 so as to provide a separation $S_1$ for the legs (406, 412). The first protrusion 432 has a first protrusion upper region 434 with a first protrusion ramp surface 436 configured to slide over the second leg 412 when advancing the first protrusion 432 toward the second leg 412. Thereafter, the second leg 412 engages a first protrusion cradling surface 438 provided on the first protrusion 432, which is contoured to cradle and retain the second leg 412 so as to provide a bending moment in the first leg 406 and the second leg 412 to increase the pressure of the friction pads (410, 416) on the brake disk 424 after they have experienced wear from being in service. As an alternative to snapping the first protrusion 432 over the second leg 412, the user can squeeze the legs (406, 412) together to allow the second end region 428 to engage the second leg 412 in such a position that the second leg 412 moves into engagement with the first protrusion cradling surface 438 when the user relaxes pressure on the legs (406, 412).

The clip 400 is also provided with a second protrusion 440 which is positioned with respect to the first end region passage 430 so as to provide a separation $S_2$ for the legs (406, 412) when the second protrusion 440 is engaged with the second leg 412. The position of the second protrusion 440 is such that $S_2<S_1$, and results in an incremental increase in force being applied to the friction pads (410, 416) when the second protrusion 440, rather than the first protrusion 432, is engaged with the second leg 412.

The second protrusion 440 has a second protrusion upper region 442 with a second protrusion ramp surface 444 configured to slide over the second leg 412 when advancing the second protrusion 440 toward the second leg 412. Thereafter, a second protrusion cradling surface 446 engages the second leg 412. Again, instead of snappably engaging the second protrusion 440 with the second leg 412, the user could squeeze the legs (406, 412) together sufficiently to allow the clip 400 to engage the second leg 412 at such location that the second leg 412 moves into engagement with the second protrusion cradling surface 446 when released. The second protrusion cradling surface 446 is contoured to cradle and retain the second leg 412 so as to provide a bending moment in the first leg 406 and the second leg 412 to increase the pressure of the friction pads (410, 416) on the brake disk 424 after they have experienced enough wear from being in service that the first protrusion 432 no longer provides a sufficient bending moment to provide sufficient force on the friction pads (410, 416) to maintain the effective operation of the vibration attenuator 402. It is further preferred than the second protrusion 440 have a greater height than the first protrusion 432 and for the second protrusion 440 to be more curled than the first protrusion 432 so as to more securely retain the second leg 412.

The clip 400 of this embodiment is also provided with a tab 448 which extends from the second end region 428 to facilitate the engaging and disengaging of the clip 400 with the second leg 412 of the attenuator 402.

While the novel features of the present invention have been described in terms of particular embodiments and preferred applications, it should be appreciated by one skilled in the art that substitution of materials and modification of details obviously can be made without departing from the spirit of the invention.

What I claim is:

1. An improved vibration attenuator for use with a disk brake lathe designed for resurfacing a brake disk, the brake disk having a pair of disk surfaces, the disk brake lathe having,
  a pair of cutting tools, each mounted to an associated tool holder, the tool holders each adjustably positioning the cutting tool mounted thereto with respect to one of the disk surfaces, and
  a cutting head assembly which supports the tool holders and is movable to move the tool holders substantially radially with respect to the brake disk,
the vibration attenuator having,
  a pair of friction pads each having a disk-engaging surface, which can be positioned to engage one of the disk surfaces of the brake disk, and
  a pair of legs, on each of which one of the friction pads is mounted,
  means for engaging the friction pads with the disk surfaces so as to apply a force to the friction pads holding them against the disk surfaces,
the improvement comprising:
  a clip terminating in a first end region and a second end region,
    said first end region configured to pivotally engage one of the pair of legs,
    said second end region having a first protrusion spaced apart from said first end region and configured such that said first protrusion can be rotatably engaged with the other of the pair of legs, said first protrusion being further configured such that, when so engaged, said first protrusion forms a cradle for the other of the pair of legs and is spaced apart from said first end region so as to provide a first separation $S_1$ between the legs when so engaged,
    wherein said first separation $S_1$ is chosen such that, when said first protrusion is engaged with the other of the pair of legs, a bending moment is provided on the legs which generates a force which is greater than the force from the means for engaging the friction pads.

2. The improved vibration attenuator of claim 1 wherein said first end region of said clip is further configured such that a passage therethrough is formed for pivotally engaging one of the pair of legs so that said first end region, when so engaged, will remain engaged unless it is forcibly disengaged.

3. The improved vibration attenuator of claim 2 wherein the means for engaging the friction pads with the disk surfaces so as to apply a force to the friction pads holding them against the disk surfaces further comprises;
  a U-shaped member fabricated from a resilient material where the legs are provided by straight sections of said U-shaped member on which the friction pads are mounted, and
  a tension spring attached between the pair of legs; and
further wherein said first protrusion further comprises:
  a first protrusion upper region with a ramp surface configured to slidably engage the other of the pair of legs,
  a first protrusion lower region configured to form said cradle which is shaped to retain the other leg once engaged in said cradle.

4. The improved vibration attenuator of claim 2 further comprising:
  a second protrusion spaced apart from said first end region and configured such that said second protrusion can be pivotably engaged with the other of the pair of legs and, when so engaged, will form a second cradle for the other leg, being spaced apart from said first end region so as to provide a second separation $S_2$ between the legs,
  further wherein $S_2 < S_1$.

5. The improved vibration attenuator of claim 3 further comprising:
  a second protrusion spaced apart from said first end region and configured such that said second protrusion can be pivotably engaged with the other of the pair of legs and, when so engaged, will form a cradle for the other leg, being spaced apart from said first end region so as to provided a second separation $S_2$ between the legs,
  further wherein $S_2 < S_1$; and
further wherein said second protrusion further comprises:
  a second protrusion upper region with a second ramp surface configured to slidably engage the other of the pair of legs,
  a second protrusion lower region configured to form said cradle which is shaped to retain the other leg once engaged in said cradle.

6. The improved vibration attenuator of claim 5 wherein said U-shaped member is coated with an elastomer material and said passage, said cradle, and said second cradle are configured to grippably engage said coating on said U-shaped member.

7. The improved vibration attenuator of claim 5 wherein said U-shaped member is coated with an elastomer material on a region between the regions of the pair of legs that are engaged by the clip.

8. The improved vibration attenuator of claim 5 further comprising;

a tab on said clip extending beyond said first protrusion.

9. A clip for a vibration attenuator having a first leg attached to a first friction pad configured for engaging a brake disk, a second leg attached to a second friction pad configured for engaging a brake disk, and means for forcibly engaging the friction pads with the brake disk, the clip comprising:

a first end region configured to pivotally engage the first leg; and a second end region having a first protrusion spaced apart from said first end region and configured such that said first protrusion can be rotatably brought into engagement with the second leg, said first protrusion being further configured to provide a cradle such that, when said cradle is engaged with the second leg, the second leg is spaced apart from the first leg by a first separation $S_1$, wherein said first separation $S_1$ is chosen such that, when said first end region pivotally engages the first leg and said cradle of said first protrusion is engaged with the second leg, an incremental bending moment is provided on the legs.

10. The clip of claim 9 wherein said first end region is further configured such that a passage therethrough is formed for pivotally engaging the first leg so that the first end region, when so engaged, will remain engaged unless it is forcibly disengaged.

11. The clip of claim 10 wherein said first protrusion further comprises:

a first protrusion upper region with a ramp surface configured to slidably engage the second leg; and a first protrusion lower region configured to form said cradle which is shaped to retain the second leg.

12. The clip of claim 11 further comprising:

a second protrusion spaced apart from said first end region and configured such that said second protrusion can be rotatably brought into engagement with the second leg and, when so engaged, will form a second protrusion cradle for the second leg, being spaced apart from said first end region so as to provide a second separation $S_2$ between the legs, further wherein $S_2<S_1$.

13. The clip of claim 12 further comprising:

a tab on said second end region extending beyond said first protrusion.

* * * * *